United States Patent
Groll

(10) Patent No.: US 9,402,510 B2
(45) Date of Patent: Aug. 2, 2016

(54) EASY CLEAN COOKWARE

(71) Applicant: All-Clad Metalcrafters LLC, Canonsburg, PA (US)

(72) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 0 days.

(21) Appl. No.: 14/251,773

(22) Filed: Apr. 14, 2014

(65) Prior Publication Data

US 2014/0305949 A1 Oct. 16, 2014

Related U.S. Application Data

(60) Provisional application No. 61/811,902, filed on Apr. 15, 2013.

(51) Int. Cl.
*A47J 36/00* (2006.01)
*A47J 37/10* (2006.01)
*A47J 36/02* (2006.01)

(52) U.S. Cl.
CPC ............... *A47J 37/10* (2013.01); *A47J 36/025* (2013.01)

(58) Field of Classification Search
CPC ....... A47J 27/002; A47J 36/025; A47J 37/10; B65D 25/34; B65D 25/14; B65D 2590/023
USPC ...................................................... 220/573.2
See application file for complete search history.

(56) References Cited

U.S. PATENT DOCUMENTS

| | | | |
|---|---|---|---|
| 4,541,411 A | 9/1985 | Woolf | |
| 6,360,423 B1* | 3/2002 | Groll | 29/527.2 |
| 7,093,340 B2 | 8/2006 | Groll | |
| 7,820,304 B2* | 10/2010 | Groll | 428/653 |
| 2008/0142526 A1* | 6/2008 | Cheng et al. | 220/573.1 |
| 2009/0321459 A1* | 12/2009 | Maczko et al. | 220/731 |
| 2014/0061205 A1* | 3/2014 | Chiu | 220/573.2 |

* cited by examiner

*Primary Examiner* — Anthony Stashick
*Assistant Examiner* — James Way
(74) *Attorney, Agent, or Firm* — The Webb Law Firm

(57) ABSTRACT

Cookware comprising a cooking surface of a bare metal and a sidewall extending upwardly from the cooking surface to a rim, wherein the sidewall is coated with a non-stick material.

10 Claims, 4 Drawing Sheets

EASY CLEAN COOKWARE

CROSS REFERENCE TO RELATED APPLICATIONS

This application claims priority to U.S. Provisional Patent Application No. 61/811,902 filed Apr. 15, 2013, which is hereby incorporated by reference for all purposes in its entirety.

BACKGROUND OF THE INVENTION

1. Field of the Invention

The present invention relates generally to cookware and, more particularly, to cookware having a non-stick surface applied selectively to the interior sidewall surface of the cookware.

2. Description of Related Art

It is well known to apply a coating of a non-stick material such as polytetrafluoroethylene (PTFE) to the flat cooking surface and sloped sidewalls of a fry pan, for example, to provide extremely easy clean-up for cookware. The life and durability of PTFE-type non-stick surfaces, however, are limiting factors in the usefulness of these surfaces. The PTFE can be scratched or marred if metal kitchen tools are used or if abrasive materials are used during cleaning. These organic coatings also can degrade if overheated during cooking, which also shortens their useful life. An uncoated, bare stainless steel pan offers excellent durability during cooking and clean-up such that metal kitchen tools and steel wool will not scratch the cook surface during cooking or clean-up. Unfortunately, during frying, for example, grease or oil will tend to spatter from the flat cooking surface of the pan and deposit on the bare sidewalls of the fry pan. These localized areas of spatter deposits will form hardened spots on the sidewalls due to the heat conducted along the sidewall. This spatter on the sidewalls oftentimes proves more difficult to remove during clean-up than the cooking residue left along the bare cooking surface. This is due to the fact that the cooking surface usually has a layer of grease or cooking oil thereon which, to a large extent, prevents the formation of the hardened spots which reside on the sidewalls during frying.

SUMMARY OF THE INVENTION

The present invention is directed to cookware that provides easy clean-up of a bare metal cooking surface with no spatter clean-up problems on the sidewall because the sidewall has a non-stick coating applied thereto.

In an embodiment of the present invention, there is a cookware including a cooking surface of a bare metal and a sidewall extending upwardly from the cooking surface to a rim, wherein the sidewall is coated with a non-stick material. The cookware may be in the form of, for example, a fry pan, sauté pan, or chef's pan. The non-stick material may contain polytetrafluoroethylene (PTFE).

The cooking surface may be substantially flat, and the sidewall may be flared outwardly toward the rim. The sidewall may be integral with the flat cooking surface by way of a radiused portion. The non-stick coating may be applied along the sidewall at a location at or above a radius of curvature of the radiused portion and extending upwardly toward the rim of the cookware.

The bare cooking surface may be one of stainless steel or aluminum.

In another embodiment, there is a fry pan including a flat, bare metal cooking surface with a sidewall extending upwardly from the cooking surface flaring outwardly to a rim, wherein the sidewall is coated with a non-stick material. The bare metal cooking surface may be stainless steel. The fry pan may be made from a bonded composite comprising an interior layer and an exterior layer of stainless steel and a core layer of aluminum or copper. The exterior layer may be a ferritic grade of stainless steel.

DETAILED DESCRIPTION OF THE ILLUSTRATED EMBODIMENT

Figure 1:
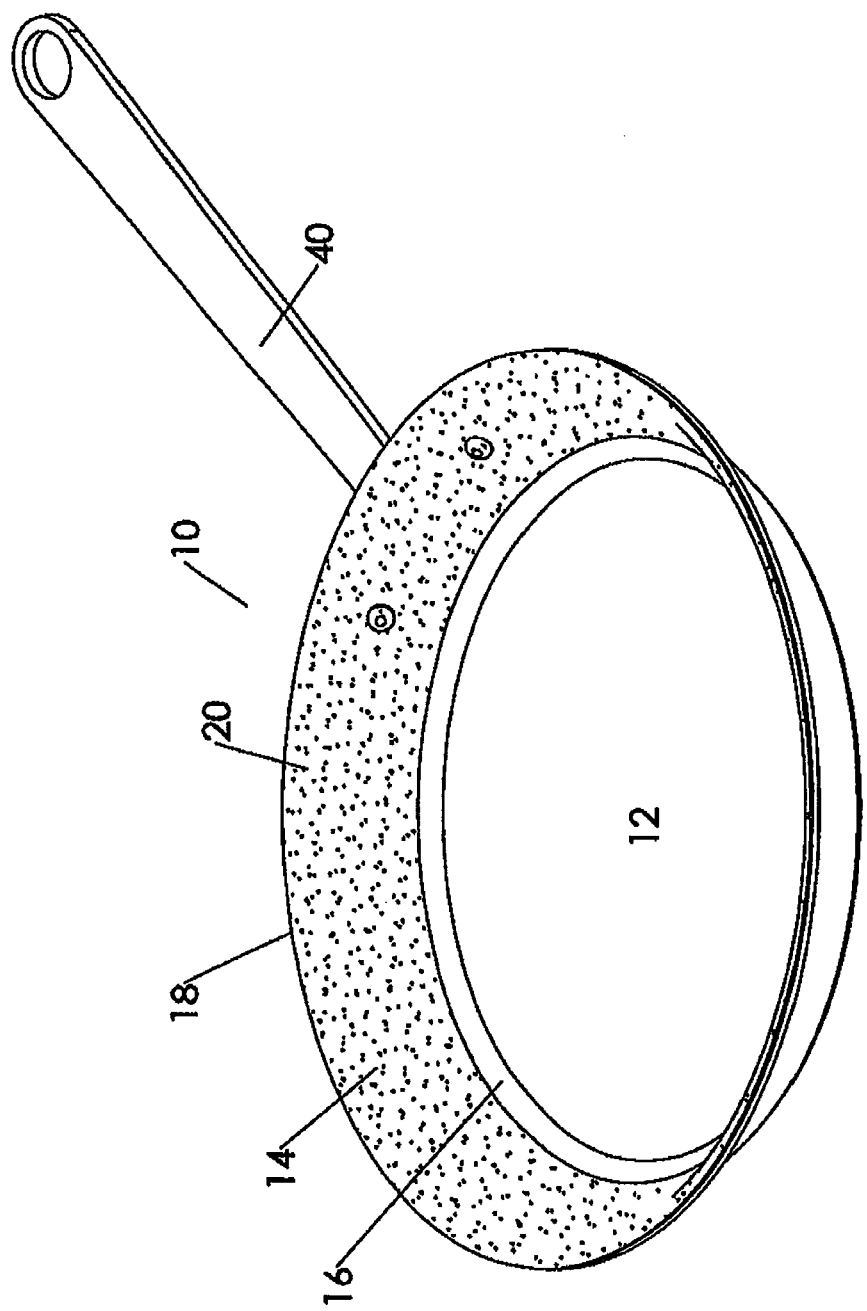
FIG. 1 is a perspective view of cookware of an embodiment of the present invention in the form of a fry pan.
Figure 2:
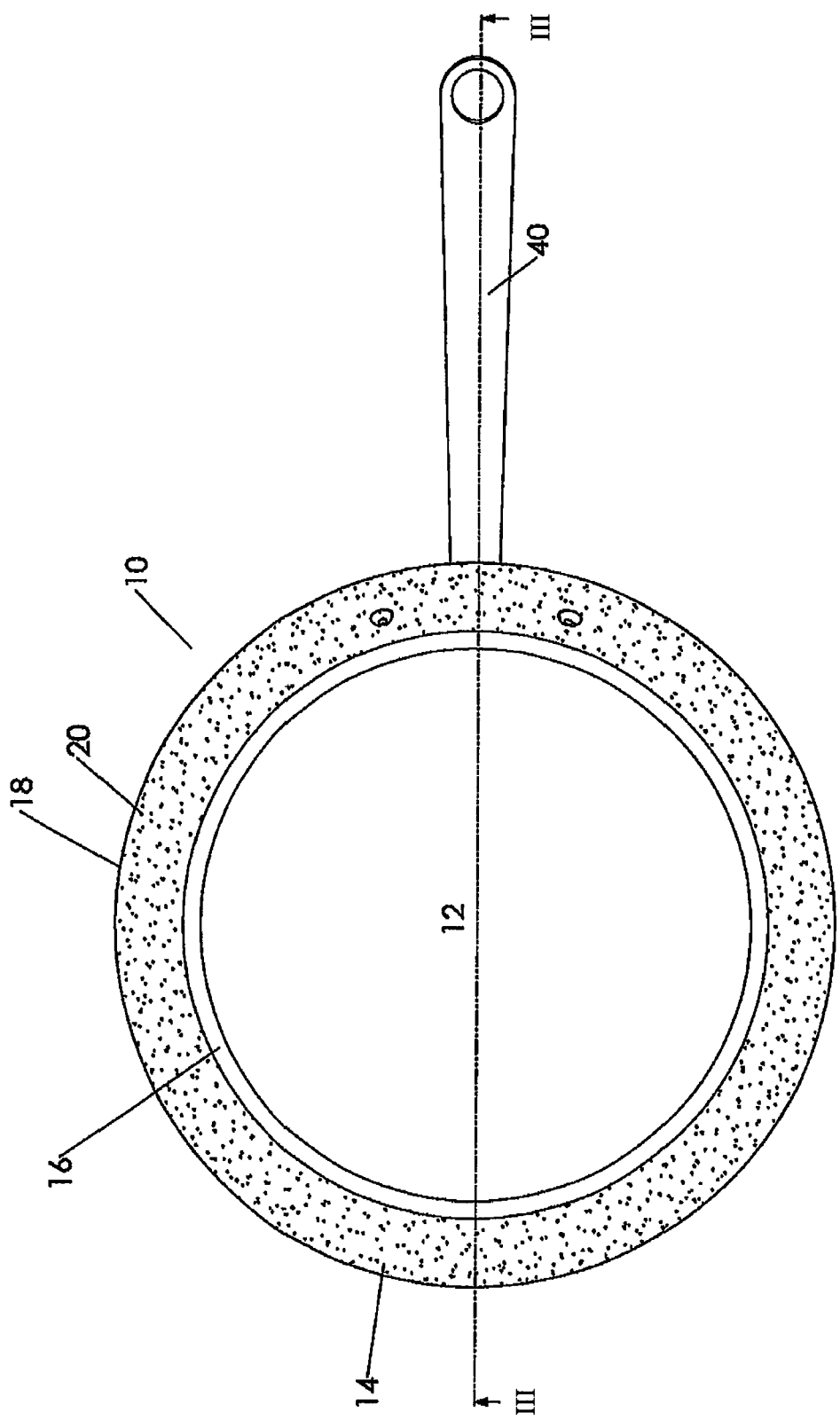
FIG. 2 is a top plan view of the cookware illustrated in FIG. 1.
Figure 3:
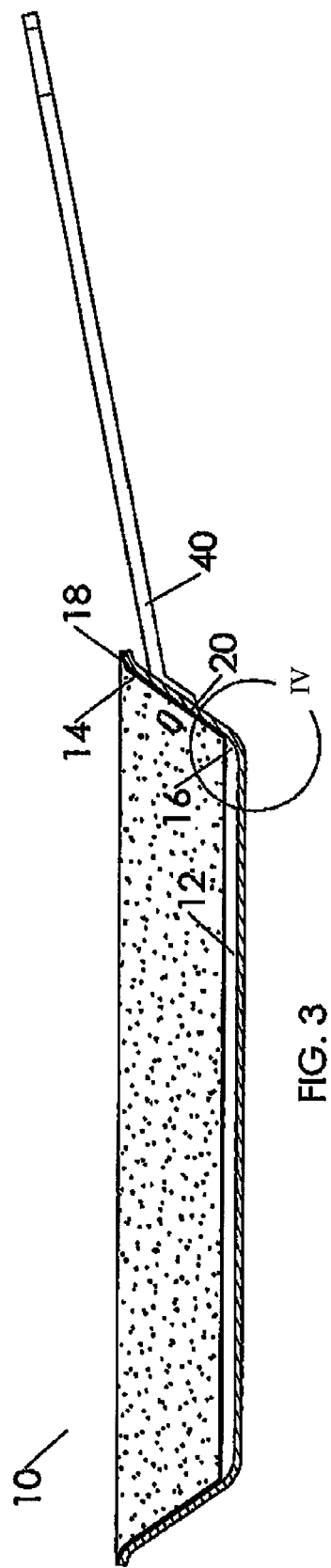
FIG. 3 is a cross-sectional, side view of the cookware taken along the section line of FIG. 2.

With reference to FIGS. 1 to 3 of the drawings, a piece of cookware is generally designated by reference numeral 10. In this instance, the cookware 10 is in the form of a fry pan. The fry pan has a substantially flat bottom surface 12 which defines the cooking surface. The surface 12 is bare metal such as stainless steel or aluminum and has no non-stick surface coating applied thereto. At the outer perimeter of the flat cooking surface 12, a radiused portion 16 is formed so as to provide a transition from the flat surface 12 to a sloped sidewall 14 of the fry pan. The sidewall 14 extends from the radiused portion 16 to a top rim 18 of the cookware 10. As illustrated, a conventional stick handle 40 is attached to the exterior of the sidewall 14. However, other handle arrangements are possible. For example, a gripping loop handle (not shown) may be attached on the sidewall 14 instead of the stick handle 40 or in addition to the stick handle 40.

Figure 4:
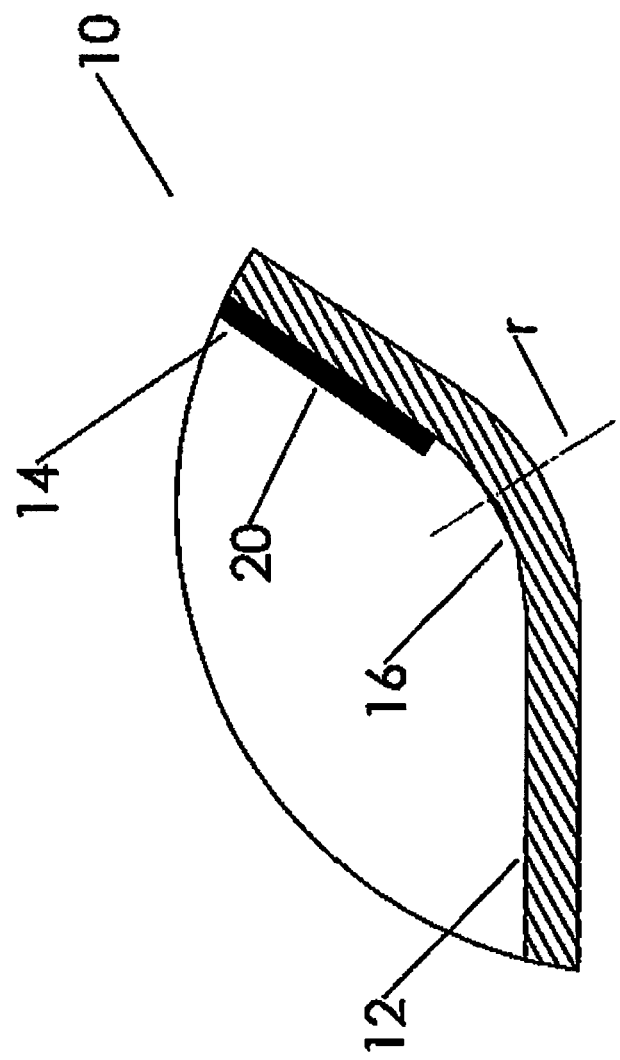
FIG. 4 is a partial, enlarged view of one lower corner of the cookware taken along the circular section depicted as "IV" in FIG. 3.

The sidewall 14 of the cookware 10 has a non-stick coating 20 applied thereto on the interior of the pan from a location starting at or just above the radiused portion 16 extending preferably to the top rim 18 of the pan 10. The starting location for the non-stick coating 20 may preferably be at the outer periphery of the cooking surface 12 or at the radius of curvature line "r" of radiused portion 16 shown in FIG. 4. In this manner, the flat cooking surface 12 remains bare and substantially free of non-stick material. The non-stick surface coating thus covers the sidewall 14 while the flat cooking surface 12 is left as uncoated, bare metal.

The bare metal cooking surface 12 is preferably stainless steel. In this manner, the sidewall 14 with the non-stick coating 20 will be exposed to grease/oil spatter from frying, for example, while the bare cooking surface 12 will collect the usual cooking residue experienced in a conventional fry pan. After cooking, clean-up is much easier using the cookware 10 of the present invention. The spatter deposited on the non-stick coating 20 is extremely easy to remove by washing in warm soapy water using a wash cloth or other non-abrasive means. The bare cooking surface 12 may be cleaned more aggressively using abrasive cleaning aids if needed to remove the cooking residue. This type of abrasive cleaning would not be possible if the cooking surface 12 had a non-stick coating. In addition, the bare cooking surface 12 permits the use of metal cooking tools during frying without the fear of damaging a non-stick surface.

The cookware 10 may be conventional (except for the non-stick coated sidewall) as to its metal construction and shape. The cookware 10 is preferably made from a multi-ply bonded composite of stainless steel, aluminum, and stainless steel layers, or other combinations including copper. In its preferred form, stainless steel layers form the inside and outside surfaces while the aluminum and copper layers form the core of the composite. The outside (or exterior) layer of stainless steel may be a ferritic grade so as to make the cookware 10 compatible with induction heating. Of course, in its simplest form, the cookware 10 may comprise a single layer of metal. The cookware 10 may be formed in various desired shapes, such as a fry pan, sauté pan, chef's pan, and other cookware forms where sidewall spatter is a problem during cooking and subsequent clean-up.

The non-stick coating 20 may be also be a conventional non-stick coating, such as a PTFE or other non-stick material used in cookware. During application of the non-stick surface 20, the cooking surface 12 of the cookware 10 may be masked to the desired location up to, at, or a location above the radiused area 16 where the non-stick surface 20 is to be formed. The pre-treatment application and post-application/curing treatment steps for forming non-stick surfaces such as PTFE and the like on cookware are, in themselves, well known and need no further explanation herein.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. Cookware comprising a unitary structure having a cooking surface of a bare metal and a sidewall extending upwardly from the cooking surface to a rim, wherein an entire inner surface of the sidewall is coated with a non-stick material.

2. The cookware of claim 1 in the form of a fry pan, saute pan, or chefs pan.

3. The cookware of claim 1 wherein the non-stick material contains polytetrafluoroethylene (PTFE).

4. The cookware of claim 1 wherein the cooking surface is substantially flat and the sidewall is flared outwardly toward the rim and wherein the sidewall is integral with the flat cooking surface by way of a radiused portion.

5. The cookware of claim 4 wherein the non-stick coating is applied along the sidewall at a location at or above a radius of curvature of the radiused portion and extending upwardly toward the rim of the cookware.

6. The cookware of claim 1 wherein the bare cooking surface is one of stainless steel or aluminum.

7. A fry pan comprising a unitary structure having a flat, bare metal cooking surface and a sidewall extending upwardly from the cooking surface and flaring outwardly to a rim, wherein an entire inner surface of the sidewall is coated with a non-stick material.

8. The fry pan of claim 7 wherein the bare metal cooking surface is stainless steel.

9. The fry pan of claim 7 made from a bonded composite comprising an interior layer and an exterior layer of stainless steel and a core layer of aluminum or copper.

10. The fry pan of claim 9 wherein the exterior layer is a ferritic grade of stainless steel.

\* \* \* \* \*